W. STRAIT.
Assignor to C. L. STRAIT.
PLOW.
No. 10,839. Reissued May 31, 1887.
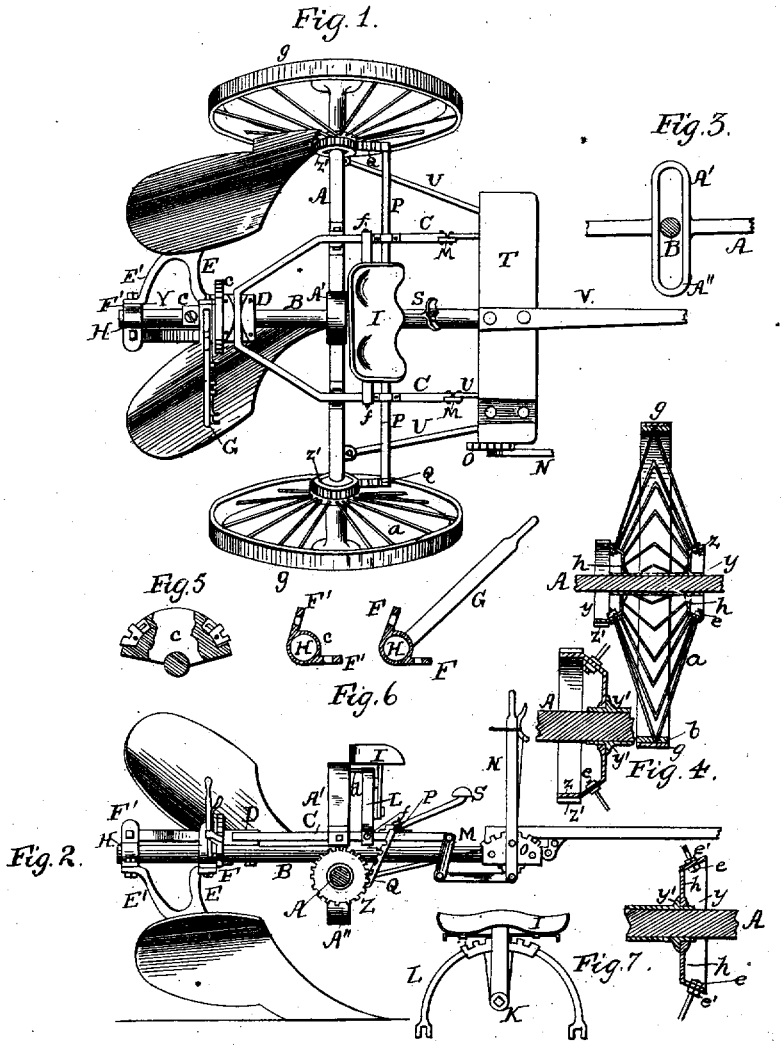
Witnesses
Amos W. Hart
A. M. Bright
Inventor
William Strait
By his Attorney
F. B. Brock
N. PETERS, Photo-Lithographer, Washington, D. C.

UNITED STATES PATENT OFFICE.

WILLIAM STRAIT, OF ELMIRA, NEW YORK, ASSIGNOR TO CELESTIA L. STRAIT, OF SAME PLACE.

PLOW.

SPECIFICATION forming part of Reissued Letters Patent No. 10,839, dated May 31, 1887.

Original No. 332,302, dated December 15, 1885. Application for reissue filed April 25, 1887. Serial No. 236,103.

*To all whom it may concern:*

Be it known that I, WILLIAM STRAIT, a citizen of the United States, residing at Elmira, in the county of Chemung and State of New York, have invented certain new and useful Improvements in Sulky-Plows; and I do hereby declare that the following is a full, clear, and exact description of said invention, such as will enable others skilled in the art to make and use my invention.

The object of my invention is to make a sulky-plow adapted to work either on level land or on a side hill, plowing back and forth, thus turning first a right-hand and then a left-hand furrow, and especially to prevent the plow from tipping over on a side hill; also, to take the plows out of the ground by a power-lift; and my invention consists of certain improvements, which will be fully understood by the following description and claims.

In the accompanying drawings, Figure 1 is a top view of my improved sulky-plow. Fig. 2 is a side view without the wheels. Fig. 3 is a sectional view of one of the wheels, showing the novel construction. Figs. 4, 5, 6, and 7 are detached views of parts of the machine.

In the construction of my sulky-plow I make the axle A with an arch, A′, above and an inverted arch, A″, below, as shown in Fig. 3, thus forming a slot, in which the plow-shaft B is allowed freely to oscillate vertically, and also to vibrate laterally in controlling the plows. Upon the axle is a pivoted double lever, C, the rear end of which supports the shaft B, which is connected to said lever by means of a box-clip, D, (shown in Fig. 1,) with the cap removed. This box-clip allows the double lever free play as the shaft B oscillates vertically or vibrates laterally. Upon the shaft B are mounted the right and left hand plows, and also the right and left hand colters or jointers. The plow-standards E have rear brackets, E′, which are connected to the plow-shaft by offsets F′ on the eye H, and similar offsets, F, on the eye-lever G, as shown in Fig. 2, connect the standards E. The eye-lever G and eye H are capable of rotation on the shaft B for the purpose of reversing the plows. These eyes are provided with a setting for holding them in place upon the shaft B. By means of these offsets the plow-standard and the plow turning the furrow is thrown a considerable distance from the center of the shaft B, and thus prevents the plow from being tipped over on a side hill, as is liable to be the case where the weight hangs upon the center of the shaft, and also enables an outer horse of the team to walk in the furrow at all times, whether right or left hand furrows are cut. I have also arranged the driver's seat so as to throw the weight of the driver on the uphill side, and thus assist in preventing the plow from tipping over. The driver's seat I is supported on pivot K, as is shown in Fig. 7, so as to swing or rock to the right or left, and be locked in place by means of a dog working into a series of notches on the arm L. The seat is made double, so that the driver may sit on either end or in the middle. Thus by rocking the seat to the uphill side, and by the driver moving also to the uphill side, the machine is so completely balanced as to prevent it from tipping over on a steep side hill.

The arch L or seat support has one end resting on and pivoted to each arm of the double lever C, and two links, M M, Fig. 2, connect this pivoted or rocking lever to the elbow-lever N, which has a spring-dog working in the notched arch O, so that the seat rises and falls as the plows are raised and lowered, and thus the weight of the driver assists in raising and lowering the plows. By means of these devices the driver can raise or lower the plows at pleasure. Also, the machine is provided with a power-lift, as follows: A rocking-shaft journaled on the double lever C is provided at each end with a segment-gear, Q, which meshes into the gear-wheel $z'$ of the rim Z of the hub, as seen in Fig. 4, and a foot-lever, S, is also attached to the rocking lever P, so that the driver, by releasing the lever N and at the same time pressing with his foot on the levers S, can bring the segment-arms into mesh with the hubs, and thus set the power-lift into action to raise the plows by the forward motion of the machine.

The platform T rests on braces U, extending from the axle. The pole V is made adjustable from the center to one side, for the purpose of using either two or three horses abreast.

The wheels are of novel construction, being made with a wrought-iron rim, *g*, having countersunk holes for the spokes *a*, which are set bracing in a double series, as seen in Fig. 4. The hub or box *y* is made with a shoulder, *y'*, on each end to receive disks *h*, flanges *z*, having also a series of holes therein for the spokes *a*, which have heads on the outer ends to fit the holes in the rim *g*, and two nuts, *e e'*, on the inner ends, in order to draw the flanges *z* close upon the box *y*, as shown in Fig. 4. Cast upon the inner flange, *z*, is a gear-wheel, *z'*, which meshes with the segment Q when the power-lift is brought into action. In this construction of wheel, if a spoke is broken, it may easily be replaced by first turning the nuts of this single spoke.

Having thus described my invention, what I claim is—

1. The combination, with the plow-shaft B and the plow-standards E E', of the eyes or collars G H, having the offsets F F', for the purpose of attaching the plow-standards to one side of the center of said shaft to prevent the plow from tipping over, substantially as set forth.

2. The combination, with the shaft and plow-standards, of the eye-lever G G' and the eye H, both provided with offsets F F', for the attachment of the plows, substantially as set forth.

3. The eye-lever G and eye H, both provided with offsets for the purpose of revolving the plows upon the shaft, substantially as set forth.

4. In a rotating plow, the described power-lift, embracing the double lever C C, the rocking lever P, the foot-lever S, the two segments Q, and the gear-wheels *z* on the hubs, all arranged to operate together in raising the plows as the machine moves forward, substantially as described.

5. The combination, with the double lever C and the described power-lift, of the seat-supporting arch L and seat I, whereby the weight of the driver is made to assist in raising the plows, substantially as described and shown.

6. The double seat I on the raised arm of the pivotal support K, the arch L, and means for laterally rocking or adjustment for the purpose of swinging the seat and transferring the weight to the uphill side, and thus preventing the plow from tipping over, substantially as set forth.

7. In a reversible sulky-plow, the seat having mechanism for an independent lateral adjustment to either side of the center, whereby said seat may be both made level and thrown to the uphill side or to the land side of the plow, substantially as set forth.

8. In a rotating plow, the wheel constructed as shown, and having the box *y*, the flanged disk *e*, the combined flanged disk and gear-wheel *z* and *z'*, rim *g*, and bracing-spokes, all arranged to operate as and for the purposes set forth.

9. In a reversible plow, and as a means for adapting it to two or three horses, the combination of a plow or plows adapted to cut right and left hand furrows, a mechanism for setting the plow standard or standards to each side of the plow-frame, and a pole or tongue set or adjusted to one side of the frame.

10. In a reversible plow, and as a means for adapting it to two or three horses, the combination of a rotating reversible plow, a mechanism for setting the plow standard or standards to each side of the plow-frame, and a pole or tongue set or adjusted to one side of the frame.

WILLIAM STRAIT.

Witnesses:
F. B. BROCK,
JOHN T. ARMS.